(12) United States Patent
Butts

(10) Patent No.: US 6,672,254 B1
(45) Date of Patent: Jan. 6, 2004

(54) MOISTURE ACTUATED IMAGING DEVICE

(76) Inventor: Becky L. Butts, 125 McGaughey Dr., Mt. Zion, IL (US) 62549

( * ) Notice: Subject to any disclaimer, the term of this patent is extended or adjusted under 35 U.S.C. 154(b) by 0 days.

(21) Appl. No.: 10/369,110

(22) Filed: Feb. 20, 2003

Related U.S. Application Data

(60) Provisional application No. 60/357,643, filed on Feb. 20, 2002.

(51) Int. Cl.⁷ .............................................. A01K 29/00
(52) U.S. Cl. ...................... 119/711; 119/51.03; 434/428
(58) Field of Search .............................. 119/51.03, 174, 119/702, 711; 434/428; 426/87

(56) References Cited

U.S. PATENT DOCUMENTS

| | | | |
|---|---|---|---|
| 356,695 A | * | 1/1887 | Reid et al. ................. 434/238 |
| 1,232,021 A | | 2/1917 | Gabriel |
| 2,210,879 A | * | 8/1940 | Cahoon et al. ............. 434/428 |
| 3,638,335 A | | 2/1972 | Gundersen et al. |
| 4,024,287 A | | 5/1977 | Golchert |
| 4,212,393 A | | 7/1980 | Lenkoff |
| 5,592,899 A | * | 1/1997 | English ....................... 119/61 |
| 5,640,931 A | | 6/1997 | Markham |
| 6,248,377 B1 | | 6/2001 | Levine |
| 6,511,687 B2 | * | 1/2003 | Hoy ............................ 426/87 |

* cited by examiner

Primary Examiner—Robert P. Swiatek
(74) Attorney, Agent, or Firm—Shlesinger, Arkwright & Garvey LLP

(57) ABSTRACT

A moisture actuated imaging device comprising a base sheet having a latent image provided on the surface of the sheet, a water soluble colorant material adapted to expose the latent image and an attractant for inducing a pet animal to lick the base sheet whereby the water soluble colorant is caused to render the latent image visible.

19 Claims, 2 Drawing Sheets

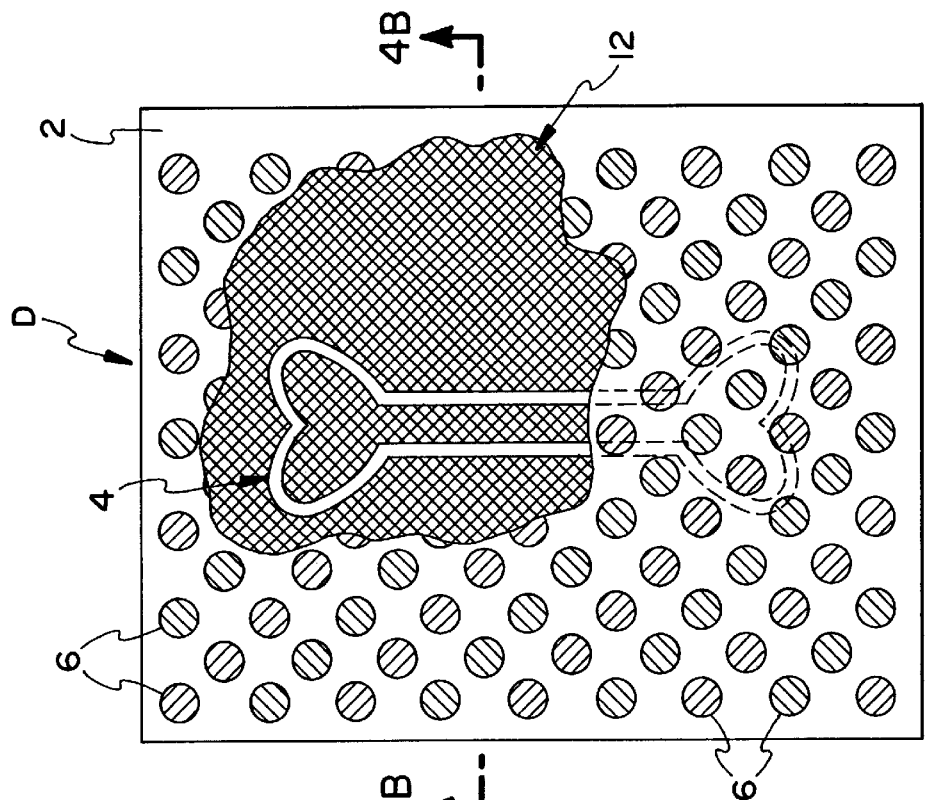
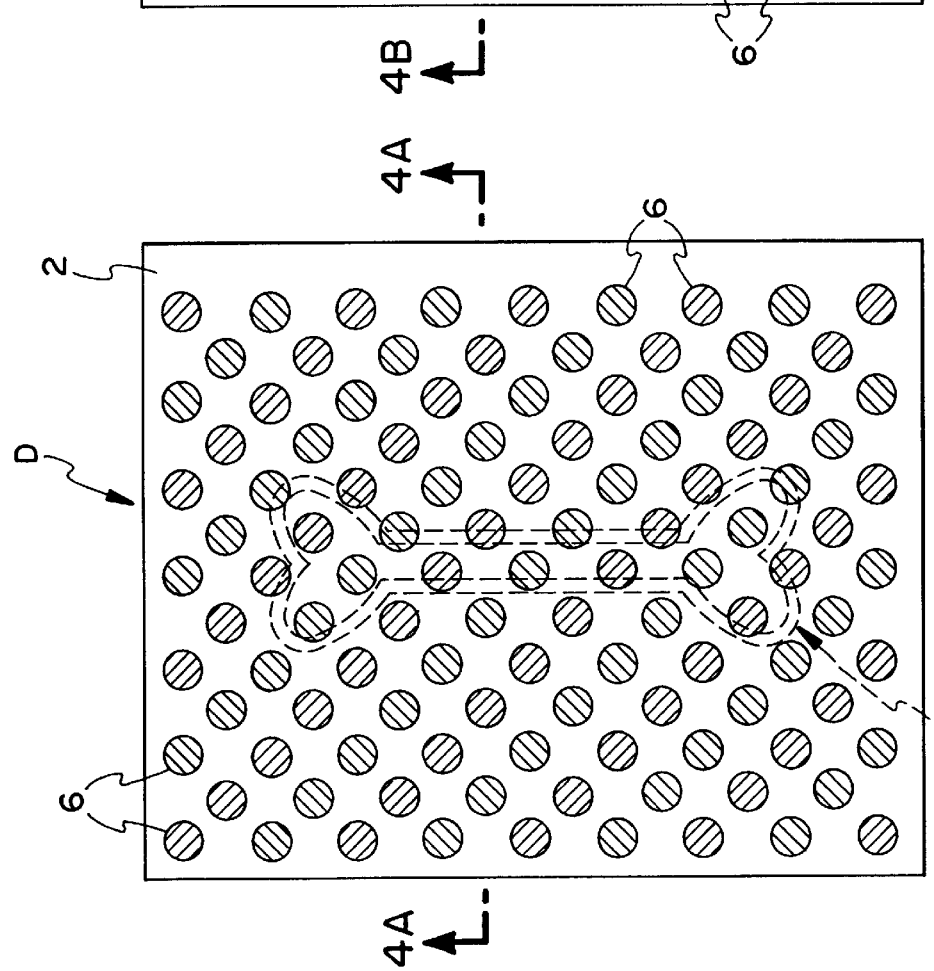

MOISTURE ACTUATED IMAGING DEVICE

CROSS-REFERENCE TO RELATED APPLICATION

This application is a nonprovisional application of U.S. provisional application serial No. 60/357,643 filed on Feb. 20, 2002.

FIELD OF THE INVENTION

The present invention relates to an imaging device and in particular, a sheet adapted to generate an image upon contact with moisture.

BACKGROUND OF THE INVENTION

Use of a water reactive sheet within an imaging device is known. For example, U.S. Pat. No. 1,232,012 to Gabriel discloses a multi-layer sheet comprising a base layer having an imprinted image provided on the base layer, the image concealed with a water reactive coating. Application of water to the reactive coating causes the coating to dissolve and expose the imprinted image underneath.

It is also known to incorporate a scent into paper for use as an attractant for animals, such as pets. U.S. Pat. No. 6,248,377 to Levine discloses a pet food container having a label provided with so called scratch and sniff technology the scent of which corresponds to the contents of the container. Similarly, U.S. Pat. No. 5,640,931 to Markham discloses a pet toy comprising a sheet material having an image and including a scent producing element. In each of these cases, it is the pet owner who actuates the scent rather than the pet.

None of the prior art imaging devices are adapted to be activated by a pet and upon activation, produces a unique image.

OBJECTS AND SUMMARY OF THE INVENTION

The present invention concerns an imaging device comprising a base layer, an attractant operatively associated with the base layer to induce a pet animal to lick the surface of the sheet, a predetermined image or indicia printed on the base layer comprising a first material that is not substantially visible, a coating of colorant and/or ink applied to the sheet, the colorant or ink formed from second material adapted to be water soluble, the second material when made soluble will not adhere to said first material so that when a pet animal is attracted to the device and induced to lick the base layer and cause the second material to become soluble, the soluble second material is distributed across the base layer rendering the indicia visible.

In another embodiment of the invention, an imaging device is provided comprising a base layer, an attractant material operatively associated with the base layer for inducing an animal to lick the base layer, indicia disposed on the base layer and formed from a first material that is not substantially visible and a colorant, the colorant provided on the base layer and formed from a second material adapted to be water soluble, the second material when made soluble will be caused to adhere to the first material whereby when an animal attracted to the device and induced to lick against the base layer, the second material is rendered soluble and distributed across the base layer to renders the indicia visible.

An object of the present invention is to provide an imaging device having an ink or colorant formed from a material that is non-toxic, edible, scented and/or flavored.

It is another object of the present invention to provide a imaging device having a predetermined image thereon formed from a material that will not adhere to the ink or colorant after being partial dissolved.

Still another object of the present invention is to provide a moisture actuated imaging device adapted to expose a first predetermined image and simultaneously generate a second image.

BRIEF DESCRIPTION OF THE DRAWINGS

FIG. 2 is a top plan view of the device according to the present invention prior to actuation;

FIG. 3 is a top plan view of the device shown in FIG. 2 following actuation and showing the exposed image;

DETAILED DESCRIPTION OF THE PREFERRED EMBODIMENTS

Figure 4A:
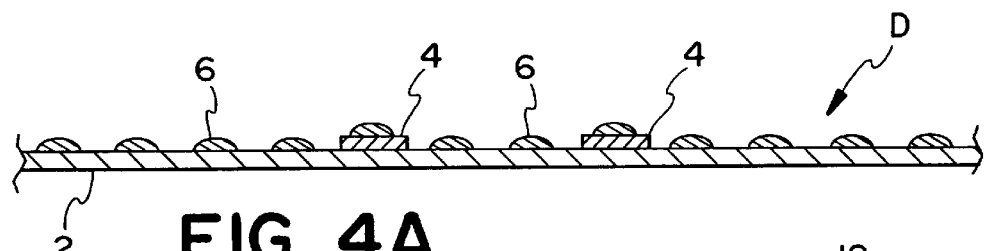
FIG. 4A is a cross-sectional view taken along the section lines shown in FIG. 2.

FIG. 2 and FIG. 4A of the drawings illustrate an embodiment of a device D according to the present invention. Device D is shown to comprise a substrate or base sheet 2 formed from a conventional paper or other nontoxic material adapted to receive printing, imaging or coating with the various materials and compositions described below. The paper may include on one side an adhesive for allowing the sheet to be secured to a surface, for example, a wall.

A predetermined image 4 comprising a first material is printed or otherwise applied to base sheet 2. The material is preferably a wax or silicon based material or other such hydrophobic material. For example, the material may be a UV ink in the form of a clear silicon based varnish. Additional compositions for forming the predetermined image include modified candle wax or other crayon-like materials. In addition, the material will not be visible when applied to the base sheet. The material can therefore be clear or translucent or having a coloration that matches the base sheet i.e. the base sheet is white and the material is also white. As is apparent, the predetermined image 4 may take the form of any of a variety of shapes or images and in FIG. 2 the representative shape is an outline of a bone. Printing maybe done by full lithography, dot matrix application, full rotogravure, screening, flexography or other method readily adapted to apply such materials to the base sheet and in a desired form of indicia.

A colorant 6 is then applied on the surface of the base sheet 2 and in at least one embodiment is done so in manner so as to overlie or cover the not-visible predetermined image 4. The colorant is a material that is water soluble and in a preferred embodiment is an water soluble ink. The colorant material is preferably ingestible and non-toxic and is certified as a food colorant. In a preferred embodiment, the colorant will comply with respect to EEC purity requirements for food colors as laid down in the U.S. government commission directive 95/45/EC. The colorant may be any designated color or intermixed colors or even an ink which is not visible until activated upon contact by moisture, or subject to a change in salinity or pH. The colorant includes conventional water coloring paints and food coloring compositions which are readily applied to the surface of the base sheet 2 in a form which dries to the surface.

The water soluble ink or colorant 6 may be applied to the base sheet 2 by spraying or coating or by any of the printing methods as set forth above and in a manner so that the ink or colorant 6 covers the base sheet 2 in a desired manner or thickness sufficient to provide the functions as described herein.

An attractant material is provided on said base sheet. The attractant material may be separately applied on the base sheet or incorporated into the base sheet or incorporated into either the colorant/ink or the material forming the predetermined image. The attractant is preferably a scented material or scent releasing material that will attract the pet animal to the device and further, induce the pet animal to lick the surface of the base sheet and actuate the device as will be further explained below. The attractant according to the present invention may further comprise a scent releasing compositions in the form of microcapsules coated onto the base sheet which release a scent when the surface is scratched and rupturing of the microcapsules occurs.

The attractant or scent may take the form of chicken flavorant, beef flavorant, liver flavorant, peanut butter flavorant, catnip or any other composition known to attract pet animals, for example, a pet cat or dog. In a preferred embodiment, the attractant will not only cause the pet to become interested in the device but also induce the pet to lick the surface of the device. For example, the ink or colorant may comprise food coloring combined with attractant material in the form of a sweetener (artificial or otherwise) material that may be readily applied in solid form to the surface of the sheet and will become water soluble upon contact with a liquid such as dog or cat saliva. Once such colorant will include a combination of citric acid, calcium phosphate, salt, sugar, artificial flavoring, artificial color, Yellow 5 Lake, Blue 1 and Blue 1 Lake. In alternative, a drink mix composition such as is sold by Kraft Foods, Inc. under the trademark KOOL-AID may be adapted to be applied to the surface of the base sheet 2.

Figure 5A:
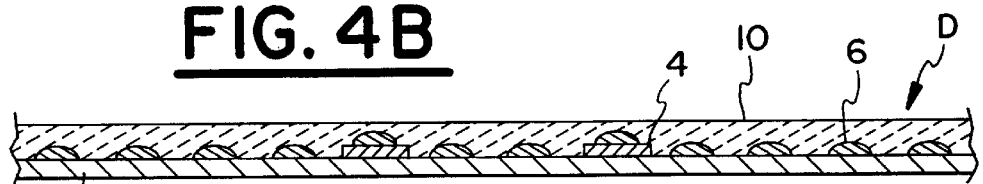
FIGS. 5A and 5B are cross-sectional views of an alternative embodiment of the embodiment shown in FIGS. 4A and 4B.

In still another embodiment, best shown in FIG. 5A, the predetermined image 4 and the water soluble ink or colorant 6 are coated or otherwise incorporated into a separate overcoat covering 10 adapted to readily dissolve upon contact with the moisture found in the saliva of a dog or cat. Covering 10 may comprise any nontoxic material having the characteristics as set forth above and will function to protect or otherwise prevent the ink or colorant and predetermined image from deterioration, inadvertent damaging or the like. As is apparent, in this embodiment, the ink or colorant is intimately incorporated into the covering material and forms a comprehensive coating over the sheet rather than being applied in a more discrete form as set forth above. Further, in this embodiment the ink or colorant is not readily visible to the viewer nor is the predetermined image 4.

Figure 1:
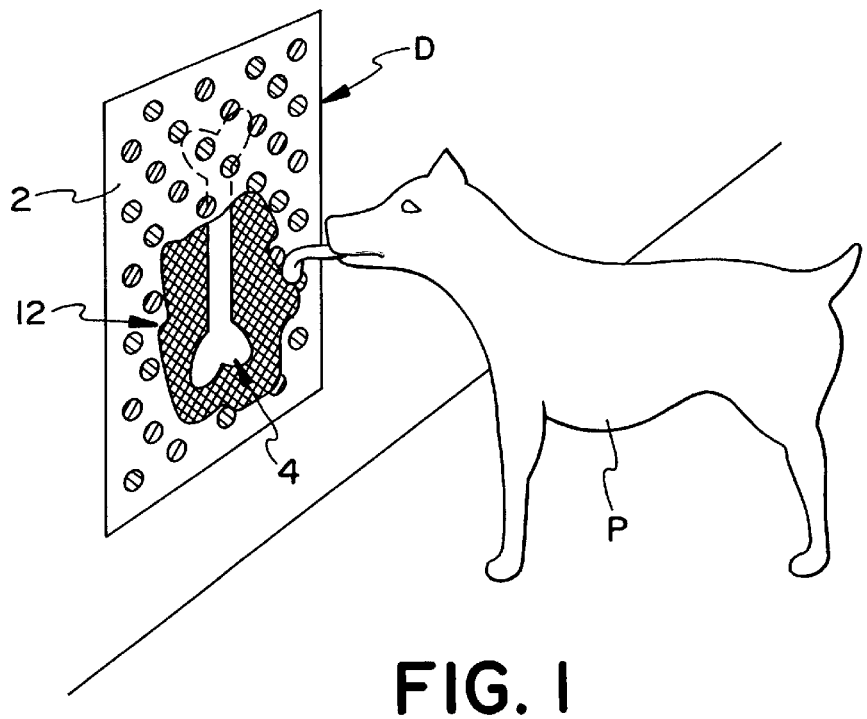
FIG. 1 illustrates a pet licking the sheet according to the present invention to cause actuation of the same.
Figure 4B:
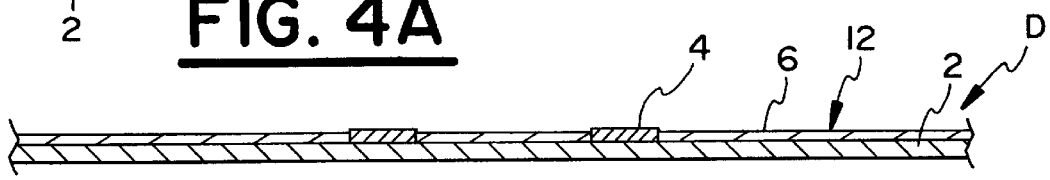
FIG. 4B is a cross-sectional view taken along the section lines shown in FIG. 3.
Figure 5B:
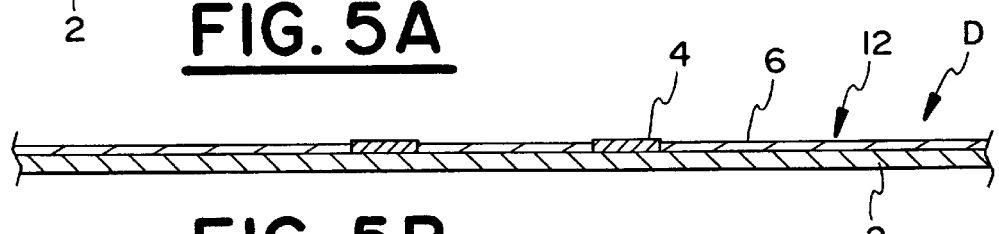

Turning now to FIG. 1, a pet animal P such as a cat or a dog, is attracted to the device due to the attractant material provided on the surface of the base sheet 2 or otherwise incorporated into the colorant or ink. The attractant induces the pet to lick the surface of the base sheet. The moisture in the saliva causes the colorant to become soluble and spread across the surface of the sheet due to the licking action of the pet and as indicated by region 12 of base sheet 2 and thereby expose the predetermined image 4 The spreading of the moisture activated colorant is also shown in each of FIGS. 3, 4B and 5B. As a result of the spreading across of the water soluble colorant, the predetermined image 4 becomes visible or is otherwise exposed to a viewer and a second unique image is formed as the diluted ink or colorant is spread across the surface of the sheet by the tongue of the pet.

In another embodiment of the invention, the water soluble colorant or ink will be formed from a material that, when rendered soluble, will be caused to adhere to the predetermined image or indicia and thereby render the predetermined image visible.

In a further embodiment, the predetermined image may simply be an outline as shown in FIG. 3 with the soluble colorant being spread both within the lines and outside the lines of the outline. In another embodiment the predetermined image is a solid image as shown in FIG. 1. In still a further embodiment, the predetermined image may be in the form of a reverse or negative image (similar to a photographic negative), having either or both hydrophilic or hydrophobic materials selectively applied to the base sheet to form a predetermined image designed to restrict the soluble colorant being applied by the pet to discrete areas across the entire surface of the sheet thereby exposing an overall complex image.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. An imaging device comprising:
   a) a base layer;
   b) an attractant material, said attractant material operatively associated with said base layer for inducing an animal to lick said base layer;
   c) indicia, said indicia disposed on said base layer and formed from a first material that is not substantially visible; and
   d) a colorant, said colorant provided on said base layer and formed from a second material adapted to be water soluble, said second material when made soluble will not adhere to said first material whereby when an animal attracted to said device is induced to lick said base layer and cause said second material to become soluble, said soluble second material is distributed across said base layer rendering said indicia visible.

2. An image producing device as in claim 1 and wherein said base layer is in the form of a sheet material having a top surface and each of said attractant, first material and second material are provided on said top surface.

3. An image producing device as in claim 1 and wherein said first material is hydrophobic material.

4. An image producing device as in claim 3 and wherein said first material is a wax based material.

5. An image producing device as in claim 3 and wherein said first material is a silicon based material.

6. An image producing device as in claim 1 and wherein said second material in a water soluble, non-toxic ink.

7. An image producing device as in claim 1 and wherein said attractant material is combined with said first material.

8. An image producing device as in claim 1 and wherein said attractant material is combined with said second material.

9. An image producing device as in claim 1 and wherein said attractant material is a micro-encapsulated scented material.

10. An image producing device as in claim 1 and wherein said attractant material is a micro-encapsulated flavorant.

11. An imaging device comprising:
   a) a base layer;
   b) an attractant material, said attractant material operatively associated with said base layer for inducing an animal to lick said base layer;
   c) indicia, said indicia disposed on said base layer and formed from a first material that is not substantially visible; and
   d) a colorant, said colorant provided on said base layer and formed from a second material adapted to be water soluble, said second material when made soluble will be caused to adhere to said first material whereby when an animal attracted to said device is induced to lick against base layer, said second material is rendered soluble and distributed across said base layer and renders said indicia visible.

12. An image producing device as in claim 11 and wherein said base layer is in the form of a sheet material having a top surface and each of said attractant, first material and second material are provided on said top surface.

13. An image producing device as in claim 11 and wherein said first material is hydrophilic material.

14. An image producing device as in claim 11 and wherein said first material is an absorbent material.

15. An image producing device as in claim 11 and wherein said second material in a water soluble, non-toxic ink.

16. An image producing device as in claim 11 and wherein said attractant material is combined with said first material.

17. An image producing device as in claim 11 and wherein said attractant material is combined with said second material.

18. An image producing device as in claim 11 and wherein said attractant material is a micro-encapsulated scented material.

19. An image producing device as in claim 11 and wherein said attractant material is a micro-encapsulated flavorant.

* * * * *